US008185815B1

(12) United States Patent
Feira et al.

(10) Patent No.: US 8,185,815 B1
(45) Date of Patent: May 22, 2012

(54) LIVE PREVIEW

(75) Inventors: Dominic Feira, Rochester, NY (US);
Andrew Welch, Rochester, NY (US)

(73) Assignee: Ambrosia Software, Inc., Rochester, NY (US)

( * ) Notice: Subject to any disclaimer, the term of this patent is extended or adjusted under 35 U.S.C. 154(b) by 1357 days.

(21) Appl. No.: 11/824,541

(22) Filed: Jun. 29, 2007

(51) Int. Cl.
*G06F 17/00* (2006.01)

(52) U.S. Cl. ..................................... 715/202
(58) Field of Classification Search .................. 715/201, 715/202
See application file for complete search history.

(56) References Cited

U.S. PATENT DOCUMENTS

| | | | | |
|---|---|---|---|---|
| 4,441,399 | A * | 4/1984 | Wiggins et al. | 84/470 R |
| 5,673,204 | A * | 9/1997 | Klingelhofer | 348/578 |
| 5,742,773 | A * | 4/1998 | Blomfield-Brown et al. | 709/228 |
| 6,115,688 | A * | 9/2000 | Brandenburg et al. | 704/503 |
| 6,311,207 | B1 * | 10/2001 | Mighdoll et al. | 709/203 |
| 6,314,576 | B1 * | 11/2001 | Asamizuya et al. | 725/91 |
| 6,332,119 | B1 * | 12/2001 | Hinderks | 704/206 |
| 6,380,950 | B1 * | 4/2002 | Montgomery et al. | 715/723 |
| 6,463,405 | B1 * | 10/2002 | Case | 704/206 |
| 6,715,126 | B1 * | 3/2004 | Chang et al. | 715/201 |
| 6,744,394 | B2 * | 6/2004 | Liu et al. | 341/155 |
| 6,819,641 | B1 * | 11/2004 | Terao et al. | 369/47.16 |
| 6,885,319 | B2 * | 4/2005 | Geiger et al. | 341/51 |
| 7,130,350 | B1 * | 10/2006 | Rault | 375/240.15 |
| 7,194,555 | B2 * | 3/2007 | Scibora | 709/247 |
| 7,246,177 | B2 * | 7/2007 | Anton et al. | 709/247 |
| 7,299,031 | B2 * | 11/2007 | Nakaya et al. | 455/412.1 |
| 7,526,185 | B2 * | 4/2009 | Lee et al. | 386/83 |
| 2002/0002412 | A1 * | 1/2002 | Gunji et al. | 700/94 |
| 2002/0071662 | A1 * | 6/2002 | Tatsumi et al. | 386/100 |
| 2002/0165721 | A1 * | 11/2002 | Chang | 704/503 |
| 2002/0168057 | A1 * | 11/2002 | Davis | 379/93.35 |
| 2002/0184505 | A1 * | 12/2002 | Mihcak et al. | 713/180 |
| 2003/0011712 | A1 * | 1/2003 | Matey | 348/565 |
| 2004/0057583 | A1 * | 3/2004 | Lawrence | 381/58 |
| 2004/0075750 | A1 * | 4/2004 | Bateman | 348/231.1 |
| 2004/0093202 | A1 * | 5/2004 | Fischer et al. | 704/216 |
| 2004/0184395 | A1 * | 9/2004 | Lee et al. | 369/275.3 |
| 2004/0207719 | A1 * | 10/2004 | Tervo et al. | 348/14.02 |
| 2005/0060147 | A1 * | 3/2005 | Norimatsu et al. | 704/230 |
| 2005/0071377 | A1 * | 3/2005 | Mihcak et al. | 707/104.1 |
| 2006/0036436 | A1 * | 2/2006 | Halcrow et al. | 704/230 |
| 2006/0083487 | A1 * | 4/2006 | Moon | 386/96 |
| 2006/0092983 | A1 * | 5/2006 | Kataoka et al. | 370/503 |
| 2006/0204225 | A1 * | 9/2006 | Chung et al. | 386/95 |
| 2006/0206582 | A1 * | 9/2006 | Finn | 709/217 |
| 2006/0233446 | A1 * | 10/2006 | Saito et al. | 382/232 |

(Continued)

OTHER PUBLICATIONS

Hans et al., Lossless Compression of Digital Audio, IEEE Jul. 2001, pp. 21-32.*

(Continued)

*Primary Examiner* — Cong-Lac Huynh
(74) *Attorney, Agent, or Firm* — Thomas A. Gallagher

(57) ABSTRACT

As digital media are being generated, a live preview of how that media would be presented—if encoded, stored, decoded, and presented from the decoded form—is presented to a user. The user can order changes to some or all of the encoding format or its parameters, with the effect of noting immediately what those changes would do to the nature of the output from that changed encoded form. The live preview is computed and presented by a computing device without any gaps or other jarring transitions between before and after the changes ordered by the user.

18 Claims, 2 Drawing Sheets

U.S. PATENT DOCUMENTS

| | | | |
|---|---|---|---|
| 2006/0259627 A1* | 11/2006 | Kellerer et al. | 709/227 |
| 2007/0033632 A1* | 2/2007 | Baynger et al. | 725/135 |
| 2007/0061029 A1* | 3/2007 | Janik | 700/94 |
| 2007/0078661 A1* | 4/2007 | Sriram et al. | 704/501 |
| 2007/0225996 A1* | 9/2007 | Haberman et al. | 705/1 |
| 2007/0242663 A1* | 10/2007 | Nakazawa et al. | 370/352 |
| 2008/0031594 A1* | 2/2008 | Aoki | 386/96 |
| 2008/0039051 A1* | 2/2008 | Stalin et al. | 455/412.1 |
| 2008/0062775 A1* | 3/2008 | Oh | 365/189.05 |
| 2008/0082189 A1* | 4/2008 | Kuwaoka | 700/94 |
| 2008/0111887 A1* | 5/2008 | Cooper et al. | 348/194 |
| 2008/0118042 A1* | 5/2008 | Hogg | 379/93.03 |
| 2008/0195397 A1* | 8/2008 | Myburg et al. | 704/500 |
| 2008/0274687 A1* | 11/2008 | Roberts et al. | 455/3.06 |
| 2009/0034750 A1* | 2/2009 | Ayoub et al. | 381/77 |
| 2009/0048695 A1* | 2/2009 | Shirahama | 700/94 |
| 2009/0177542 A1* | 7/2009 | Haberman et al. | 705/14 |
| 2009/0217239 A1* | 8/2009 | Ford | 717/113 |
| 2010/0185502 A1* | 7/2010 | Roberts et al. | 705/14.7 |
| 2010/0257569 A1* | 10/2010 | O'Hanlon | 725/110 |

OTHER PUBLICATIONS

Gu et al., NMP A New Network Music Performance System, IEEE 2004, pp. 176-185.*

Liebchen et al., Improved Forward-Adaptive Prediction for MPEG-4 Audio Lossless Coding, Google 2005, pp. 1-10.*

Lin et al. Energy Consumption Analysis of Audio Applications on Mobile Handheld Devices, Google 2007, pp. 1-4.*

Kim et al., An Audio Watermarking Scheme Robust to MPEG Audio Compression, Google 1999, pp. 1-5.*

Brandenburg et al., Comparison of Filterbanks for High Quality Audio Coding, IEEE 1992, pp. 1336-1339.*

Arnold, Subjective and Objective Quality Evaluation of Watermarked Audio Tracks, IEEE 2002, pp. 1-7.*

Schuller et al. Perceptual Audio Coding Using Adaptive Pre-and-Post-Filters and Lossless Compression, IEEE 2002, pp. 379-390.*

* cited by examiner

LIVE PREVIEW

BACKGROUND

Digital rendition of media, including audio and visual media, allows users to conveniently edit that media using common computing devices, such as a personal workstation or a notebook computer. One known problem is that such digital media are encoded in a wide variety of formats, each with differing advantages with respect to data compression, fidelity, precision, and possibly other aspects of the original digital media. This problem is particularly acute when a user is required to make a choice between data formats before an ideal trade-off among these factors is more completely known to that user. While it is possible to convert between pairs of differing formats, fidelity and precision often cannot be recovered once they have been lost due to data compression. On the other hand, sufficient data compression is often desirable to allow the digital media to fit into allocated storage, such as for a mobile device.

SUMMARY

As digital media are being generated, a live preview of how that media would be presented—if encoded, stored, decoded, and presented from the decoded form—is presented to a user. The user can order changes to some or all of the encoding format or its parameters, with the effect of noting immediately what those changes would do to the nature of the output from that changed encoded form. The live preview is computed and presented by a computing device without any gaps or other jarring transitions between before and after the changes ordered by the user.

DESCRIPTION

Nature of the Description

Read this application in its most general form. This includes, without limitation:

References to specific structures or techniques include alternative or more general structures or techniques, especially when discussing aspects of the invention, or how the invention might be made or used.

References to "preferred" structures or techniques generally mean that the inventor contemplates using those structures are techniques, and think they are best for the intended application. This does not exclude other structures or techniques for the invention, and does not mean that the preferred structures or techniques would necessarily be preferred in all circumstances.

References to first contemplated causes or effects for some implementations do not preclude other causes or effects that might occur in other implementations, even if completely contrary, where circumstances would indicate that the first contemplated causes or effects would not be as determinative of the structures or techniques to be selected for actual use.

References to first reasons for using particular structures or techniques do not preclude other reasons or other structures or techniques, even if completely contrary, where circumstances would indicate that the first structures or techniques are not as compelling. The invention includes those other reasons or other structures or techniques, especially where circumstances would indicate they would achieve the same effect or purpose as the first reasons, structures, or techniques.

Terms and Phrases

Read this application with the following terms and phrases in their most general form. The general meaning of each of these terms or phrases is illustrative, not in any way limiting.

The term "format" generally refers to any encoding technique by which media, whether audio or visual or otherwise, that can be sensed by a human being, is maintained in a digital format that can be sensed by a computing device.

The phrase "data compression" generally refers to techniques in which media, whether audio or visual or otherwise, that can be sensed by a human being, is maintained in and otherwise-limited amount of storage. As described herein, in general, a greater degree of data compression involves a lesser degree of precision or fidelity to the original digital media, and vice versa.

The terms "fidelity" and "precision" generally refer to the degree of accuracy with respect to a set of original digital media, that a particular set of data in a digital format is faithful to the original sensation of that original digital media by a human being.

Figures and Text

FIG. 1

Figure 1:
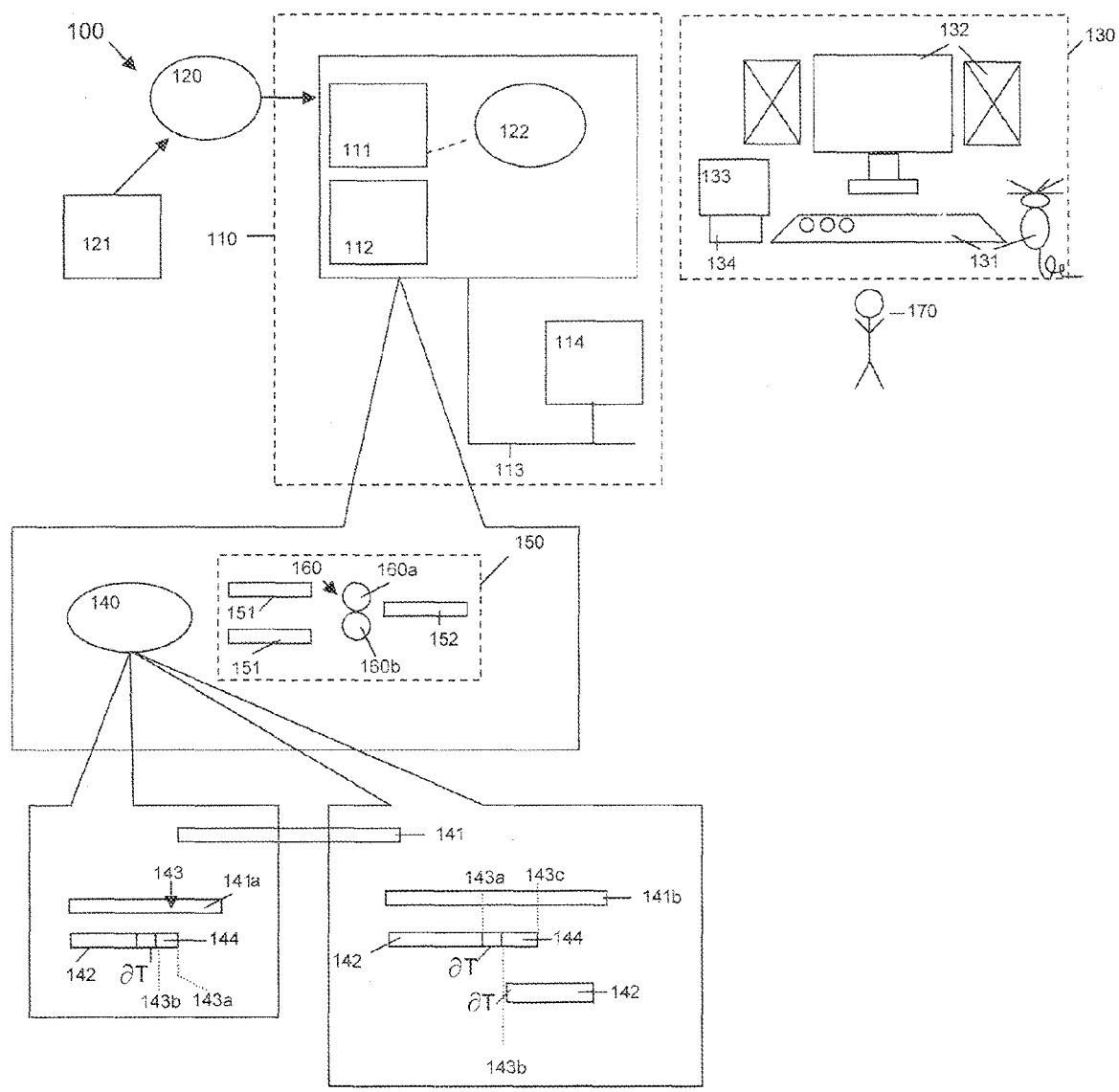
FIG. 1 shows a block diagram of a system according to this application.

A FIG. 1 shows a block diagram of a system according to this application.

A system 100 includes elements as shown in the FIG. 1, including at least:

110 an information-processing device

120 a media stream to be processed

130 a set of control and display elements

As described below in this application in other and further detail, the information processing device 110 operates to perform computations and other methods steps as might be necessary or convenient to achieve the purposes described in this application. In general, those purposes include maintaining that media stream 120 in an accessible format in memory or mass storage, decoding information associated with that media stream 120 and presenting and media stream 120 to the user 170 (described below), responding to those control and display elements 130, and using the control and display elements 130 to present that media stream 120 to the user 170.

The information-processing device 110 includes elements as shown in the FIG. 1, including at least:

111 a computing device, including a processor, program and data memory, and mass storage

112 a set of software elements

113 a communication link

114 one or more external devices (not strictly part of the information-processing device)

In operation of the computing device 111, the processor operates under control of instructions maintained in the program memory and the mass storage. The processor operates on the software elements 112. The data memory and mass storage maintain the software elements 112 in storage and for manipulation by the processor. Instructions interpret rule by the processor, as well as the media stream 120, might be maintained in the data memory or mass storage 111.

The communication link 113 couples the information-processing device 110, including the computing device 111 and the software elements 112, to the one or more external devices 114. The communication link 113 might include any form of communication pathway, such as for example, a network, an internal communications path in a computing device, or otherwise.

As described below, the media stream 120 might come from an audio file 121, such as maintained in data memory or mass storage, or might come from a the processor 111, operating under control of application program code 122. In either case, the media stream 120 includes digital information, as described below, which is encoded by the processor 111, operating under control of an encoder, and decoded by the processor 111, operating under control of a decoder. The decoded form is available for presentation, by the processor 111, to the user 170.

The set of control and display elements 130 includes elements as shown in the FIG. 1, including at least:
- 131 a set of control elements disposed for allowing one or more users 170 to set or modify media parameters, select media to be presented, or otherwise control the information-processing system 100
- 132 a set of presentation elements disposed for allowing one or more users 170 to receive media presentations, such as for example a monitor and a set of speakers
- 133 a set of input/output elements disposed for allowing one or more users 170 to exchange and record data with the system 100 in cases which those data are either (1) exchanged in bulk, or (2) disposed on a physical medium 134

As described herein, the one or more users 170 (disposed either locally to the system 100 or otherwise) might control the system 100 using the control elements 131. The one or more users 170 might receive presentations of media from the presentation elements 132. The one or more users 170 might import or export media in bulk, or might import or export instructions for performing the process steps described in this application, including exchanging that media or those instructions with media or instructions dispose on the physical medium 134.

The set of software elements 112 includes elements as shown in the FIG. 1, including at least:
- 140 a set of media information
- 150 a set of instruction threads
- 160 a set of data buffers and pointers The media information 140 includes elements as shown in the FIG. 1, including at least:
- 141 a set of audio input data, as well as a first set of presentable audio data 141a decoded and re-encoded from that audio input data 141 in a first format, and a second set of presentable audio data 141b decoded and re-encoded from that audio input data 141 in a second format
- 142 a set of processed already-played audio data
- 143 a current read head position pointer, sometimes referred to herein as the "read head", possibly referencing either a first position 143a or a second position 143b, and possibly referencing a switch reference time 143c
- 144 a set of extra presentable audio data to be discarded, sometimes referred to herein as a set of "limbo frames"

As described below in this application in other and further detail, the media information 140 includes the audio input data 141 and a set of already-played audio data 142, the former representing both past audio data already decoded and presented to the user 170 and future audio data yet to be decoded and presented to the user 170, and the latter representing past audio data already decoded and presented to the user 170. As described below, live preview of different encoding formats for the media stream 120 might have the effect that some amount of audio input data 141 might have to be decoded a second time, or alternatively, some amount of the already-played audio data 142 might have to be discarded, to allow the user 170 a smooth presentation of the media stream 120 when switching encoding formats.

The set of instruction threads 150 includes elements as shown in the FIG. 1, including at least:
- 151 an input thread
- 152 a playback thread As described below in this application in other and further detail, the processor 111 operates under control of instructions, as maintained in the program memory, to perform process steps for the input thread 151 and to perform process steps for the playback thread 152. As described below, the input thread 151 receives the set of audio input data 141, and performs the (relatively more difficult) tasks of encoding that audio input data 141 for presentation to the user 170, using an encoder for a selected format, and from a result of encoding that audio input data 141, i.e., a set of encoded data capable of being presented to the user 170, applies a decoder for that same selected format. The playback thread 152 receives a result of decoding that audio input data 141, i.e., a set of presentable audio data, and presents that presentable audio data to the user 170. As described below, a distinction is made between the input thread 151 and the playback thread 152, because it may occur that more than one input thread 151 is concurrently operational, with the effect that more than one set of audio data are available for use by the playback thread 152.

The set of data buffers and pointers 160 includes elements as shown in the FIG. 1, including at least a double-buffered ring buffer, including a first ring buffer 160a and a second ring buffer 160b.

As described below in this application in other and further detail, one aspect of maintaining a smooth transition when the user 170 desires live preview of the media stream 120 in a different format is that it might be necessary or convenient to re-encode some amount of the audio input data 141. A location in a stream representing the audio input data 141 is described by the current read head position pointer 143.

Similarly, as that audio input data 141 is encoded into encoded data and decoded into presentable audio data by one of the input threads 151, presentable audio data is deposited into the ring buffer 160, where it is maintained for reading and presentation by the playback thread 152. In the context of the invention, there is no particular requirement that the ring buffer 160 take any particular form, and there is no reason to limit the ring buffer 160, or the invention, in this regard.

As described below, one aspect of maintaining a smooth transition when the user 170 desires live preview of the media stream 120 in a different format is that presentable audio data will generally be read (and consumed) by the playback thread 152, while new presentable audio data will generally be written by the input thread 151. During the course of a transition between encoding formats, presentable audio data is written by a first input thread 151 into a first portion of the ring buffer 160, such as 160a, even though such presentable audio data might have already been written by a second input thread 151 into a second portion of the ring buffer 160, such as 160b. The playback thread 152 reads a sufficient amount of presentable audio data from the second portion of the ring buffer 143, until the time comes to start reading presentable audio data from the first portion of the ring buffer 160. This has the effect that the first portion and the second portion of the ring buffer 160 aid in providing a double-buffering technique for the transition between encoding formats.

As described below, when the user 170 desires live preview of the media stream 120 in a different format, it might occur that some amount of presentable audio data has been generated by the second input thread 151 and written into the second ring buffer 160, even though that presentable audio data is to be discarded without being read by the playback thread 152. That amount of presentable audio data is sometimes referred to herein as a set of "limbo frames" 144.

Operation of the system is described in further detail below.

FIG. 2

Figure 2:
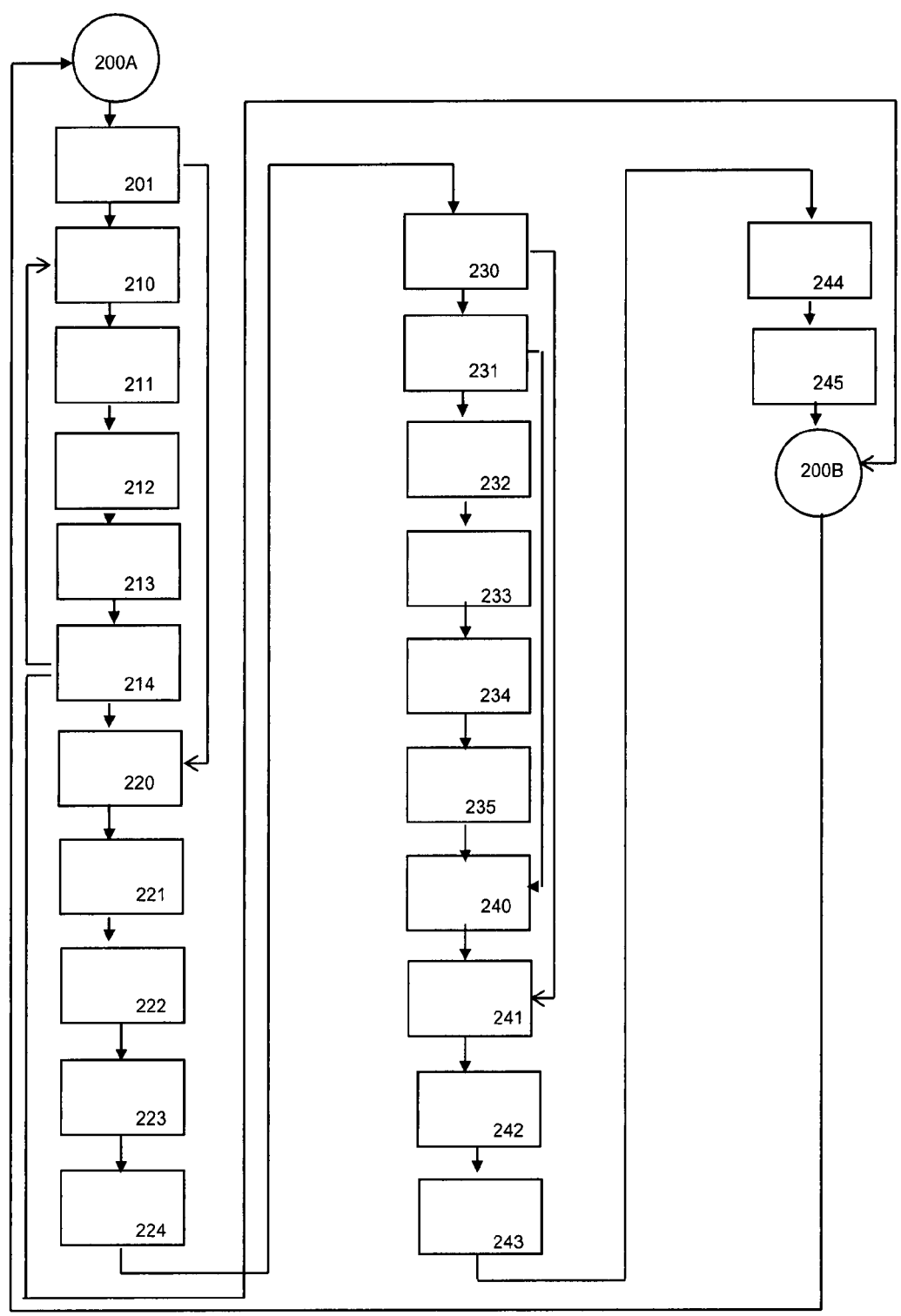
FIG. 2 shows a conceptual view of a process flow in a method according to this application.

A FIG. 2 shows a conceptual view of a process flow in a method according to this application.

A method 200 includes flow markers and process steps as shown in the FIG. 2, including at least:

The steps following each of the flow markers might be performed concurrently, in parallel, pipelined, or otherwise using multiple computing devices, or within a single computing device with multiple cores, threads, processes or processors, with the steps following a first flow marker being performed a first set of data while the steps following a second flow marker being performed a second set of data.

Beginning of Method

A flow marker 200A indicates a beginning for the method 200.

At a step 201, the method 200 causes the processor 111 to begin operating in the context of the input thread 151 at the flow marker 210, and to begin operating in the context of the playback thread 152 at the flow marker 220.

Processing Audio Input Data

Reaching a flow marker 210 indicates that the method 200 is ready to process audio input data 141.

At a step 211, the processor 111, operating in the context of the input thread 151, receives the audio input data 141.

At a step 212, the processor 111, operating in the context of the input thread 151, processes the audio input data 141 and generates a set of encoded audio data.

At a step 213, the processor 111, operating in the context of the input thread 151, processes the encoded audio data and generates a set of presentable audio data.

At a step 214, the processor 111, operating in the context of the input thread 151, places the presentable audio data one of the two ring buffers 160.

The processor 111, operating in the context of the input thread 151, continues with the flow marker 210. This has the effect that the processor 111, operating in the context of the input thread 151, repeats the step 211, the step 212, and the step 213, until the user 170 directs otherwise or until the processor 111 reaches the end of the audio input data 141.

The user 170 might direct the processor 111 to stop processing the audio input data 141, or to process the audio input data 141 using a different encoding format.

In those cases in which the processor 111 reaches the end of the audio input data 141, and those cases in which the user 170 directs the processor 111 to stop processing, the method 200 continues with the flow marker 200B, where the method 200 ends.

Presenting Audio Data

Reaching a flow marker 220 indicates that the method 200 is ready to playback frames of presentable audio data.

At a step 221, the processor 111, operating in the context of the playback thread 152, receives the presentable audio data from one of the two ring buffers 160.

At a step 222, the processor 111, operating in the context of the playback thread 152, processes the presentable audio data from one of the two ring buffers 160.

At a step 223, the processor 111, operating in the context of the playback thread 152, presents the presentable audio data to the user 170. In one embodiment, the presentable audio data are presented to the user 170 in the form of playing sound equivalent to that data using speakers, i.e., the presentation elements 132.

Although this application describes in greater detail those embodiments in which the media stream 120 is an audio sequence and data representing that stream represents audio data, in the context of the invention, there is no particular reason by the media stream 120 or the invention should be limited in that regard. In alternative embodiments, the media stream 120 might include audio-visual data, still or moving visual data, animation, or any other information capable of being presented to a user 170.

At a step 224, the method 200 determines when the user 170 has instructed a change in encoding format, such as while the processor 111 is presenting the presentable audio data. In response to that determination, the method proceeds with the flow marker 230.

Changing Encoding Formats (Audio File)

Reaching a flow marker 230 indicates that the method 200 is ready to change encoding formats.

At a step 231, the method 200, having determined when the user 170 has instructed a change in encoding format, determines whether the media data 120 is being read from an audio file 121 or from an application process 122. If the media data 120 is being read from an audio file 121, the method 200 proceeds with the step 232. If the media data 120 is being read from an application process 122, the method 200 proceeds with the flow marker 240.

At a step 232, the method 200 determines how far ahead the input thread 151 has decoded the audio file 121, as opposed to the playback thread 152. As the playback thread 152 receives and processes presentable audio data from the input thread 151, the playback thread 152 will always be at least a small amount of time behind the input thread 151.

At a step 233, the method 200 moves the read head 143 "back in time" from a first position 143a reached by the input thread 151 to a second position 143b reached by the playback thread 152. This step might leave some set of "limbo frames" 144 left over for removal.

At a step 234, the processor, operating under control of the input thread 151, reads from the audio file 121 starting at the new position 143b of the read head 143, and generates presentable audio data.

At a step 235, the processor, operating under control of the playback thread 152, receives the presentable audio data from the input thread 151, and continues presenting the media stream 120 to the user 170.

After reading this application, those skilled in the art will note that the input thread 151 takes at least a finite amount of time dT to start generating presentable audio data for use by the playback thread 152. This has the effect that it takes at least that same finite amount of time dT before the changeover can occur in response to the user 170. The playback thread 152 uses just that amount of time dT to present frames that were encoded and re-decoded using the earlier encoding method, switching over when frames are ready that are encoded and re-decoded using the new encoding method.

If there are any additional frames left in the ring buffer 160 after the switchover by the playback thread 152, i.e., limbo frames 144, they are discarded. After reading this application, those skilled in the art will note that these limbo frames 144 are for just the amount of time the read head 143 was moved "back in time" in the earlier step 233, minus the amount of time dT.

The method 200 continues at the flow marker 200B, where the method 200 ends.

Changing Encoding Formats (Application Process)

Reaching a flow marker 230 indicates that the method 200 is ready to change encoding formats for the output of an application process 122.

At a step 241, the method 200 determines how far the input thread 151 has encoded and decoded the audio file 121, as shown by a first position 143a of the read head 143.

At a step 242, the processor 111, operating under control of the input thread 151, reads from the application process 122 starting at the same first position 143a of the read head 143, and generates new presentable audio data encoded and re-decoded in the second format. This new set of presentable audio data is placed in the alternate half of the ring buffer 160, with the effect that encoded frames from the input thread 151 are double-buffered for use by the playback thread 152, presentable audio data responsive to the first format going into the first half and presentable audio data responsive to the second format going into the second half.

At a step 243, the processor 111, operating under control of the playback thread 152, continues reading from the ring buffer 160 while the input thread 151 is generating presentable audio data responsive to the second audio format.

At a step 244, the method 200 determines that presentable audio data responsive to the second audio format is available in the ring buffer 160 for the playback thread 152 to present. The method 200 causes the processor 111, operating under control of the playback thread 152, to read presentable audio data from the second portion of the ring buffer 160, thus presenting audio data responsive to the second format seamlessly and without noticeable transition from the first format. This occurs at a second position 143b for the read head 143.

At a step 245, as the input thread 151 is writing presentable audio data responsive to the second format to the second half of the ring buffer 160, and the playback thread 152 is reading that presentable audio data responsive to the second format from the second half of the ring buffer 160, there is no particular need to retain any of the "extra" presentable audio data 144 responsive to the first format that was placed in the first half of the ring buffer 160. Accordingly, the method discards that "extra" presentable audio data 144.

After reading this application, those skilled in the art will recognize that the amount of "extra" presentable audio data 144 is responsive to the finite amount of time dT needed for the input thread 151 to start generating presentable audio data, for use by the playback thread 152, responsive to a new encoding-decoding format. Thus, at a switch reference time 143c (when the user 170 requests a change in format), the playback thread 152 should be reading from a first position 143a of the presentable audio data, in a first portion of the ring buffer 160.

Thereafter, the format change will take that finite amount of time dT needed for the input thread 151 to start generating presentable audio data, completing at a second position 143b of the audio input data 141. At that time, the playback thread 152 will be able to read presentable audio data from a second portion of the ring buffer 160. Any extra presentable audio data 144 remaining in the first portion of the ring buffer 160 can be discarded.

The method 200 continues at the flow marker 200B.

End of Method

Reaching a flow marker 200B indicates an end of the method 200.

Alternative Embodiments

After reading this application, those skilled in the art will recognize that the invention has wide applicability, and is not limited to the embodiments described herein.

The invention claimed is:

1. A method for comparing digital audio streams, comprising:
   receiving digital audio data from a data source;
   encoding the digital audio data according to a first compression scheme and storing it as first encoded data;
   encoding the digital audio data according to a second compression scheme and storing it as second encoded data; and
   presenting the first encoded data and the second encoded data in a manner whereby they can be audibly compared substantially in real time.

2. The method according to claim 1, wherein:
   said first compression scheme and said second compression scheme are user selectable from a plurality of compression schemes.

3. The method according to claim 1, further comprising:
   prior to presenting, decoding the first encoded data and the second encoded data, wherein
   the presenting comprises presenting the decoded first encoded data and the decoded second encoded data.

4. The method according to claim 1, wherein:
   the presenting includes converting the first encoded data and the second encoded data to a first analog signal and a second analog signal and feeding the first and second analog signals to an audio transducer.

5. The method according to claim 4, wherein:
   the feeding is user selectable whereby the user can switch between the first and second analog signals.

6. The method according to claim 5, wherein:
   the switch is substantially instantaneous so that the first and second analog signals can be compared in real time.

7. The method according to claim 1, wherein:
   the first compression scheme includes a plurality of parameters, each of which are user selectable.

8. The method according to claim 7, wherein:
   the second compression scheme includes a plurality of parameters, each of which are user selectable.

9. The method according to claim 1, further comprising:
   displaying information about the first and second compression schemes.

10. The method according to claim 9, wherein:
    the information includes an indication of the amount of memory required to store the digital audio data utilizing the first compression scheme and the amount of memory required to store the digital audio data utilizing the second compression scheme.

11. A system for comparing digital audio streams, comprising:
    means for receiving digital audio data from a data source;
    storage means for storing the digital audio data;
    means for encoding the digital audio data according to a first compression scheme and storing it as first encoded data;
    means for encoding the digital audio data according to a second compression scheme and storing it as second encoded data; and
    means for presenting the first encoded data and the second encoded data in a manner whereby they can be audibly compared substantially in real time.

12. The system according to claim 11, further comprising:
    user operable means for selecting said first compression scheme and said second compression scheme from a plurality of compression schemes.

13. The system according to claim 11, further comprising:
    means for decoding the first encoded data and the second encoded data, wherein the means for presenting comprises means for presenting the decoded first encoded data and the decoded second encoded data.

14. The system according to claim 11, wherein:
the means for presenting includes means for converting the first encoded data and the second encoded data to a first analog signal and a second analog signal and means for feeding the first and second analog signals to an audio transducer.

15. The system according to claim 14, wherein:
the means for feeding is user operable whereby a user can switch between the first and second analog signals.

16. The system according to claim 15, wherein:
the means for feeding is switchable substantially instantaneously so that the first and second analog signals can be compared in real time.

17. The system according to claim 11, wherein:
the first compression scheme includes a plurality of parameters, each of which are user selectable.

18. The system according to claim 17, wherein:
the second compression scheme includes a plurality of parameters, each of which are user selectable.

* * * * *